(12) United States Patent
Wu

(10) Patent No.: US 6,270,918 B1
(45) Date of Patent: Aug. 7, 2001

(54) LOW PROFILE VENTABLE SEAL FOR AN ELECTROCHEMICAL CELL

(75) Inventor: Xixian Wu, North Olmsted, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 0 days.

(21) Appl. No.: 09/246,352

(22) Filed: Feb. 8, 1999

(51) Int. Cl.$^7$ .................................................. H01M 2/12
(52) U.S. Cl. ............................................. 429/56; 429/171
(58) Field of Search ................................. 429/53–59, 61, 429/62, 64, 72, 82, 171, 172, 7, 89, 174, 185; 29/623.1

(56) References Cited

U.S. PATENT DOCUMENTS

| | | | |
|---|---|---|---|
| 3,218,197 | * | 11/1965 | Carmichael et al. . |
| 4,191,806 | * | 3/1980 | Levy . |
| 4,581,304 | | 4/1986 | Beatty et al. ........................ 429/56 |
| 5,080,985 | | 1/1992 | Wiacek et al. ..................... 429/172 |
| 5,173,379 | * | 12/1992 | Ichinose et al. . |
| 5,532,081 | * | 7/1996 | DePalma et al. . |
| 5,853,912 | * | 12/1998 | Naing et al. . |
| 5,925,478 | * | 7/1999 | Tucholski . |
| 5,932,371 | * | 8/1999 | Tucholski . |
| 6,022,635 | * | 2/2000 | O'Hara, III et al. . |
| 6,042,967 | * | 3/2000 | Sargeant et al. . |

* cited by examiner

Primary Examiner—Stephen Kalafut
Assistant Examiner—Susy Tsang
(74) Attorney, Agent, or Firm—Stewart A. Fraser

(57) ABSTRACT

An electrochemical cell having a low profile seal assembly for sealing the open end of the cell container. The seal assembly includes a support member having a surface area that covers substantially the open end of the cell container and has a plurality of openings therein. A seal member is disposed against the support member to provide a sealed closure to the open end of the cell container. The seal member has a membrane with a groove formed in a surface thereof which acts as a stress concentrator. The groove is located against the support member such that said groove is located adjacent to the openings formed in the support member and is further supported by the support member at other locations.

29 Claims, 2 Drawing Sheets

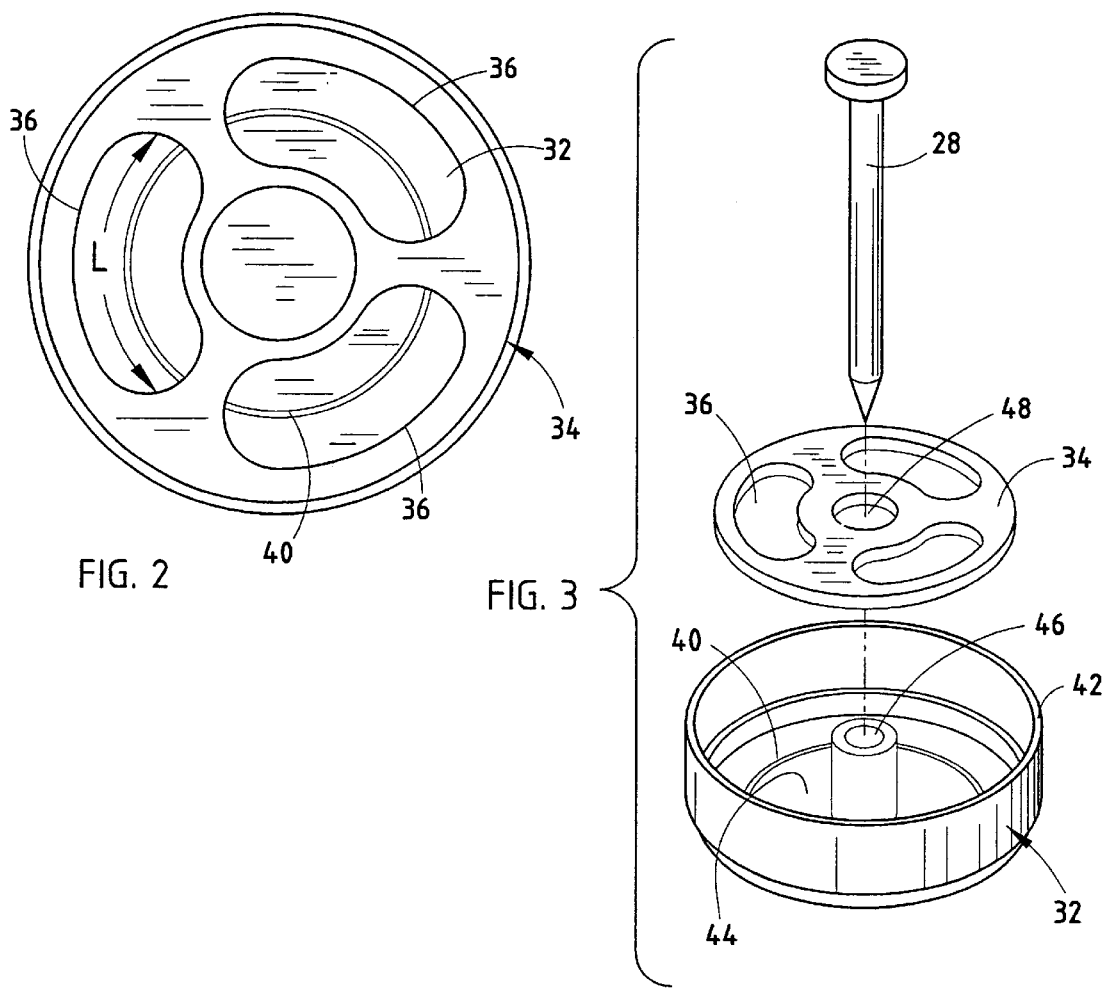
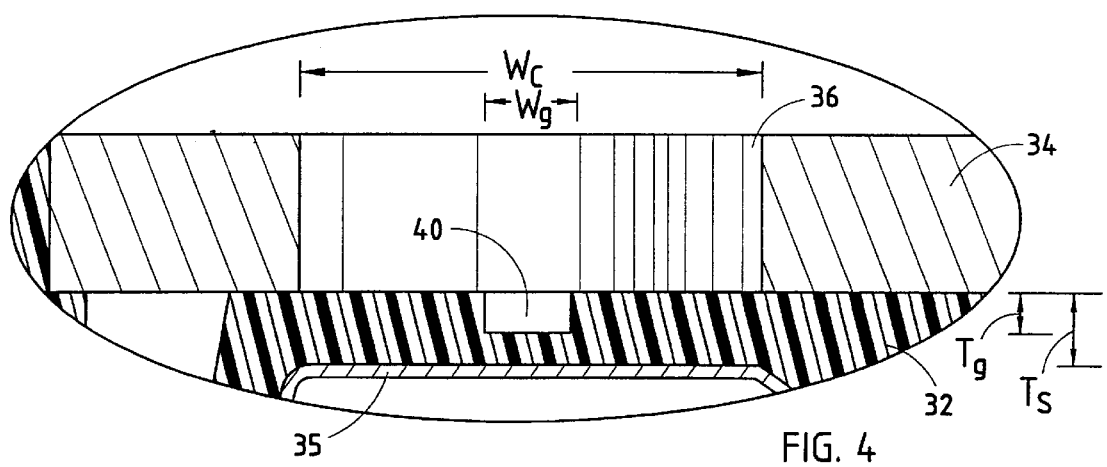

LOW PROFILE VENTABLE SEAL FOR AN ELECTROCHEMICAL CELL

BACKGROUND OF THE INVENTION

The present invention generally relates to electrochemical cells and, more particularly, to a low profile seal assembly for sealing the open end of a cell container such that the seal vents when exposed to excessive pressure.

Conventional alkaline electrochemical cells generally include a steel cylindrical can having a positive electrode, referred to as the cathode, which comprises manganese dioxide as the active material. The electrochemical cell also includes a negative electrode, referred to as the anode, which comprises zinc powder as the active material. The cathode is generally formed against the interior surface of the steel can, while the anode is generally centrally disposed in the can. Alternately, in jelly-roll cells, the anode and cathode are spirally wound. A separator is located between the anode and the cathode, and an alkaline electrolyte solution simultaneously contacts the anode, the cathode, and the separator. A conductive current collector is commonly inserted into the anode active material, and a seal assembly, which includes a seal member, provides closure to the open end of the cell's steel can to seal the active electrochemical materials in the sealed volume of the can.

Cylindrical alkaline cells are commonly sealed closed by placing an annular nylon seal above a bead formed near the open end of the cell can and then crimping the upper end of the can inwardly and over the outer periphery of the seal to compress the seal against the bead. However, electrochemical cells employ electrochemically active materials such as zinc which generate hydrogen gas during storage, under abusive conditions and sometimes during or following service use. When the container can is sealed, the build-up of high pressure gases within the sealed container may cause damage to the cell and/or the device in which the cell is employed.

One approach to avoiding a potentially excessive build-up of pressure in the cell container has been to employ a resealable valve system that periodically releases excessive gas pressure from within the active cell volume. However, the periodic and continuous release of gas pressure may, in some situations, permit electrolyte leakage containing salt and other particulate which may foul the resealable valve, and generally requires additional costly components. Another approach to avoiding excessive build-up of pressure involves employing a sealed membrane that is intended to blowout when exposed to excessive pressure either by puncture or rupture of the membrane itself. Puncture mechanisms such as a spiked member may be employed to punch a hole in the thin membrane once the pressure reaches a predetermined amount. Alternately, a rupture mechanism may be employed in the form of a thin membrane which ruptures when the internal pressure of the cell becomes too great. One example of a thermoformed film membrane employed as a vent mechanism is disclosed in U.S. Pat. No. 4,581,304, entitled "THERMOFORMED FILM MEMBER VENT FOR GALVANIC CELLS," the disclosure of which is incorporated herein by reference. The aforementioned patent discloses the use of a thermoformed film member retained across a vent aperture located in the inner cover of the electrochemical cell such that the thermoformed film member is intended to rupture at high pressure to provide a vent passage from the sealed internal volume to the surrounding atmosphere.

Other approaches to venting excessive cell pressure have included the use of a vent formed in the seal of the battery which is intended to rupture upon experiencing an excessive pressure build-up in the cell. For example, U.S. Pat. No. 5,080,985 discloses a groove formed in both the top and bottom surfaces of a plastic grommet seal such that the groove is designed to shear open at very high pressure. While the prior approaches for venting high pressure gas from the cell have resulted in the ability to vent excessive pressure, many of the prior approaches having not optimized the volume consumed by the seal member, while other approaches lack an accurate rupture pressure mechanism.

Accordingly, it is therefore an object of the present invention to provide for an electrochemical cell having a pressure release mechanism which occupies a minimum amount of cell volume. It is also an object of the present invention to provide for such a pressure release mechanism that effectively vents gas when exposed to an expected rupture pressure.

SUMMARY OF THE INVENTION

The present invention improves the protective safeguards of an electrochemical cell with an enhanced low profile seal assembly for sealing the open end of the electrochemical cell's container to provide controlled pressure venting. To achieve this and other advantages, and in accordance with the purpose of the invention as embodied and described herein, the present invention provides for a seal assembly for sealing the open end of an electrochemical cell container, an electrochemical cell having a low profile seal assembly, and a method of assembling an electrochemical cell having a low profile seal assembly. The seal assembly comprises a seal member disposed in the open end of the cell's container to provide a sealed closure to the open end of the container. The seal member has a stress concentrator including a groove formed in a surface of the seal member. In addition, the seal assembly has a support member disposed in the open end of the container and against the seal member. The support member has a surface area that covers substantially the open end of a cell container and has at least one opening formed therein. The groove formed in the seal member is located against the support member so that the groove is located adjacent to at least one opening in the support member and is located against the support member at other locations. The low profile seal assembly occupies a minimal amount of cell volume and serves as an accurate pressure relief mechanism.

These and other features, advantages and objects of the present invention will be further understood and appreciated by those skilled in the art by reference to the following specification, claims and appended drawings.

BRIEF DESCRIPTION OF THE DRAWINGS

In the drawings:

FIG. 2 is a top view of the seal assembly according to the present invention;

FIG. 3 is an exploded elevational view of the seal assembly of FIG. 2; and

FIG. 4 is an enlarged sectional view of the seal assembly taken from section IV in FIG. 1 which further illustrates the groove formed in the seal member.

DETAILED DESCRIPTION OF THE PREFERRED EMBODIMENT

Figure 1:
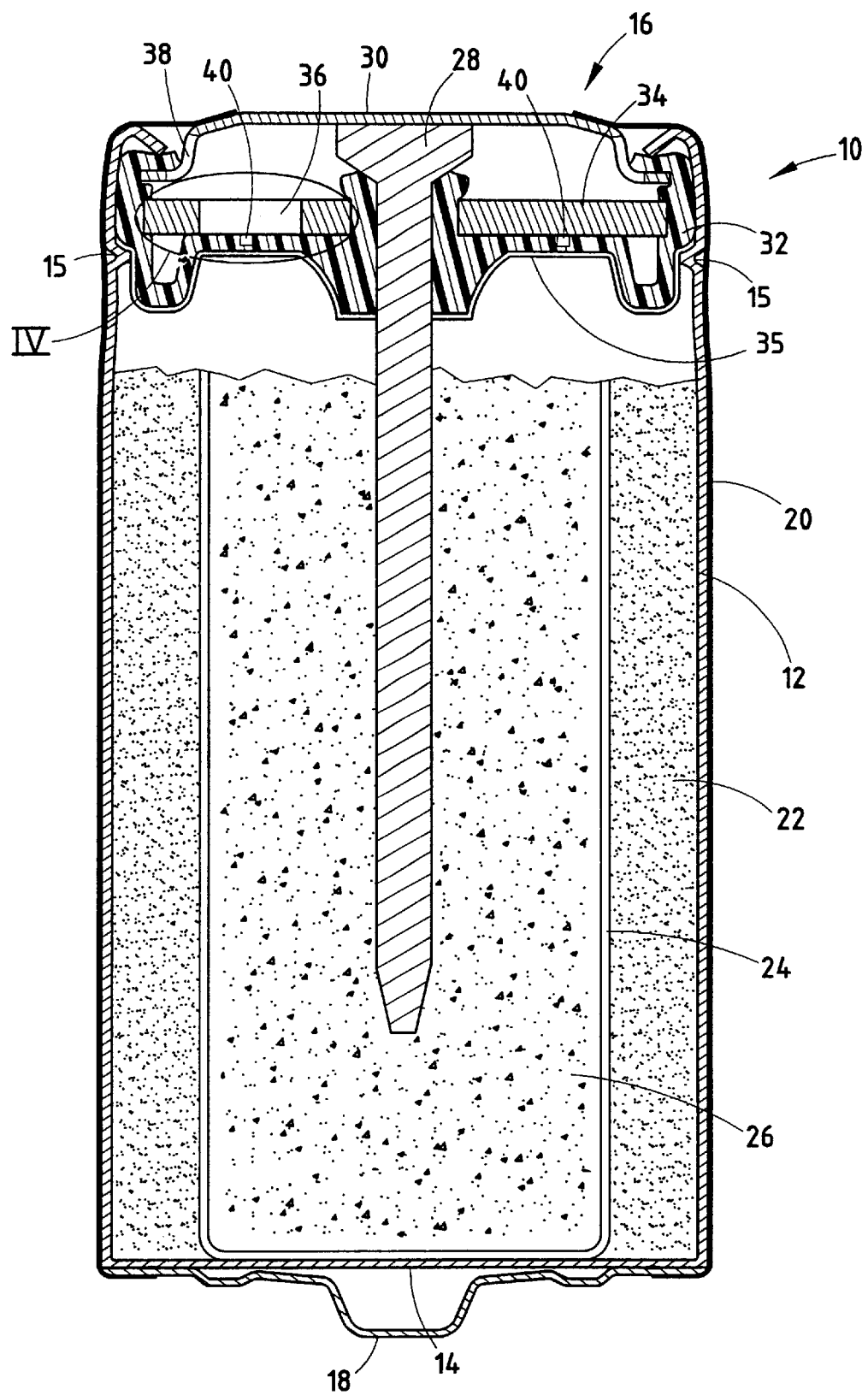
FIG. 1 is a longitudinal cross-sectional view of an electrochemical cell having a seal assembly including a stress concentration groove integrally formed in a seal member according to the present invention.

Referring to FIG. 1, a cylindrical alkaline electrochemical cell 10 is shown therein. Electrochemical cell 10 includes a cylindrical steel can 12 having a closed bottom end 14 and an open top end 16. The closed bottom end of can 12 further includes a positive cover welded or otherwise attached thereto and formed of plated steel with a protruding nub 18 at its center region which forms the positive contact terminal of cell 10. Assembled to the open end 16 of steel can 12 is a cover and seal assembly with an outer cover 30 which forms the negative contact terminal of cell 10. A metalized, plastic film label 20 is formed about the exterior surface of steel can 12, except for the ends of steel can 12. Film label 20 is formed over the peripheral edge of the positive cover.

A cathode, preferably formed of a mixture of manganese dioxide, graphite, forty-five percent potassium hydroxide solution and additives, is formed about the interior surface of steel can 12. A separator 24, preferably formed of a non-woven fabric that prevents migration of any solid particles in the cell, is disposed about the interior surface of cathode 22. An anode 26, preferably formed of zinc powder, a gelling agent and additives, is disposed with an electrolyte inside the separator 24 and is in contact with a current collector 28, which may include a brass nail. Accordingly, the cathode 22 is configured as the cell's positive electrode, and the anode 26 is configured as the cell's negative electrode.

The current collector 28 contacts the outer negative cover 30 which forms the negative contact terminal of cell 10. The outer negative cover 30 is preferably formed of plated steel, and may be held in contact with current collector 28 via pressure contact or a weld. An annular seal member 32 is disposed in the open end of the steel can 12 to prevent leakage of the electrochemically active cell materials contained in steel can 12. Seal member 32 directly contacts a support member 34 which forms an inner cell cover and is preferably formed of steel. Together, the seal member 32 and support member 34 form a seal assembly for sealing closed the active electrochemical materials inside of can 12. The assembling of the seal assembly includes disposing the seal member 32 on top of a bead 15 formed radially inward on the inner wall of the can 10 and reducing the diameter of the can 12 above the bead 15 such that the seal member 32 is compressed against the support member 34. The upper end of the can 10 is crimped inwardly and over the outer periphery of the seal 32 to compress it against the bead 15. It should also be appreciated that the outer negative cover 30 is electrically insulated from the steel can 12 by way of seal member 32.

The support member 34 serves as an inner cover to rigidly support seal member 32, and includes one or more vent openings, i.e., apertures, 36 formed through the surface thereof. The outer negative cover 30 also includes one or more vent openings 38 that serve to expose the cell's non-active volume, which is defined herein as the volume between seal member 32 and outer cover 30, to the outside atmosphere. Vent openings 36 and 38 serve to vent pressure build-up from within the cell 10 to the outside atmosphere. Together, the outer cover 30, the current collector 28, seal member 32, and inner support member 34 form the cover and seal assembly that is inserted into the open end 16 of steel can 12 to seal the active ingredients within an active cell volume.

According to the present invention, the seal member 32 has a circular stress concentration groove 40 formed in the top surface thereof which acts as a pressure release mechanism when exposed to an excessive pressure differential. The seal member 32 directly abuts the support member 34 such that the stress concentration groove 40 is located adjacent to vent openings 36 as well as non-vented portions of support member 34. Referring particularly to FIGS. 2 and 3, the support member 34 is configured in the shape of a disk having three vent openings 36 which are equi-angularly spaced from each other. Each of vent openings 36 in support member 34 is formed in the shape of a kidney bean having an effective arcuate opening length adjacent to groove 40 as indicated by reference numeral L. According to the configuration shown, the vent opening 36 provides an open passageway adjacent to groove 40 such that excessive pressure build-up from within the cell 10 will concentrate stress on groove 40. When sufficient excessive pressure is present, groove 40 will rupture, i.e., shear, near the center of the vent opening 36 to release pressure to the outside atmosphere. The non-venting portions of support member 34 provide structural support to seal member 32 such that seal member 32 is supported both on the radially outward and radially inward edges of opening 36, as well as at certain locations adjacent to groove 40. The groove 40 is preferably centrally located below opening 36 midway between the radially outward and inward edges of opening 36.

With particular reference to FIG. 3, the seal member 32 is shown having a boss 46 formed at the center thereof and vertical extending walls 42 formed at the outer peripheral edge. Seal member 32 has a disk-like membrane 44 formed between boss 46 and outer peripheral walls 42. Groove 40 is located in membrane 44. The support member 34 sits directly against the top surface of the disk-like membrane 44 of seal member 32 and includes a central opening 48 formed therein for receiving boss 46. The current collector 28 extends through opening 48 and boss 46 which provides a sealing engagement between boss 46 and current collector 28.

Referring to FIG. 4, an enlarged view of stress concentration groove 40 is shown directly abutting the vent passage 36 in support member 34. Groove 40 preferably includes either one or two abrupt corners formed between adjacent walls. According to the embodiment shown, groove 40 is configured as an annular channel that is rectangular in cross section with right angles formed at the base corners thereof by vertical walls joining a flat horizontal bottom wall. By providing a sharp, e.g., ninety degree, corner, the groove 40 effectively acts as a stress concentrator to provide a clean shear at the corner of groove 40 upon experiencing a predetermined pressure differential. Groove 40 has a width identified by $W_g$, while the vent opening 36 formed in support member 34 has a width identified as $W_c$. The groove 40 has a thickness $T_g$ that is preferably approximately one-half the thickness $T_s$ of the immediately surrounding seal material. The groove 40 preferably has a width $W_g$ to thickness $T_g$ ratio ($W_g/T_g$) in the range of 0.2–1.2. The vent opening 36 preferably has an arcuate length L to width $W_c$ ratio ($L/W_c$) equal to or greater than 1.0. In addition, the ratio of thickness $T_s$ of the disk-like membrane 44 to the width $W_c$ of vent opening 36 is preferably in the range of 0.1–0.2. The groove 40 is suitable to rupture when subjected to a pressure differential of approximately 1500 (psi) pounds-per-square inch for an AAA-size cell and up to approximately 1000 psi for an AA-size cell.

According to one embodiment, seal member 32 is made of a nylon, such as ZYTEL® 101F which is commercially available from E.I. duPont de Nemours and Co., Inc. Seal member 32 can be integrally formed to include groove 40 by using a conventional injection molding process. It should be appreciated that while nylon is a preferred material, other polymers or other seal materials could be used. In addition, the bottom surfaces of seal member 32 may be coated with a layer of asphalt 35 to prevent chemical degradation of the seal member 32 due to the presence of electrolyte.

Accordingly, the present invention provides for a seal assembly having a seal member 32 directly abutting a support member 34, with the seal member 32 having a stress concentration groove 40 formed therein and positioned in relation to openings 36 in the support member 34 to provide an accurate rupturing pressure release mechanism that will rupture when subjected to a predetermined pressure differentially addition, the seal assembly consumes less volume, and thereby allows for the employment of a greater quantity of active electrochemical cell materials.

It will be understood by those who practice the invention and those skilled in the art, that various modifications and improvements may be made to the invention without departing from the spirit of the disclosed concept. The scope of protection afforded is to be determined by the claims and by the breadth of interpretation allowed by law.

The invention claimed is:

1. A seal assembly for sealing the open end of an electrochemical cell container, said seal assembly comprising:
   a seal member disposed in said open end of said container to provide a sealed closure to the open end of the container, said seal member having a stress concentrator including a groove formed in a surface of said seal member; and
   a support member adapted to be disposed in said open end of said container and against the seal member, said support member having a surface area that covers a substantial portion of the open end of the container and further having at least one opening formed therein, wherein said opening has a wall section displaced on one side of the groove and a wall section displaced on another side of the groove.

2. The seal assembly as defined in claim 1, wherein said wall sections define at least one opening.

3. The seal assembly as defined in claim 2, wherein said support member further has a wall section adjacent said groove such that said support member further provides support directly against a portion of said groove.

4. The seal assembly as defined in claim 1, wherein said groove is centrally located within said opening.

5. The seal assembly as defined in claim 1, wherein said support member comprises a circular inner cover.

6. The seal assembly as defined in claim 1, wherein said seal member provides a seal for a substantially circular opening, and said groove comprises a substantially circular groove.

7. The seal assembly as defined in claim 1, wherein said seal member comprises nylon.

8. The seal assembly as defined in claim 1, wherein said support member comprises metal.

9. The seal assembly as defined in claim 1, wherein said groove includes walls and a corner formed between two adjoining walls.

10. The seal assembly as defined in claim 1, wherein said groove has a ratio of width to thickness in the range of 0.2–1.2.

11. The seal assembly as defined in claim 1, wherein said at least one opening formed in said support member has a ratio of length to width greater than 1.0.

12. The seal assembly as defined in claim 1, wherein said groove is formed in a substantially planar membrane of said seal member.

13. The seal assembly as defined in claim 12, wherein a ratio of thickness of said membrane to width of the opening in said support member is in the range of 0.1–0.2.

14. An electrochemical cell comprising:
   a container having a closed bottom end and an open top end;
   a positive electrode disposed in said container;
   a negative electrode disposed in said container;
   a separator disposed between said positive electrode and said negative electrode;
   an electrolyte disposed in said container;
   a seal member disposed in the open top end of said container for closing said open top end of said container, said seal member having a stress concentrator including a groove formed in a surface thereof; and
   a support member disposed in said open end of said container and against a surface of said seal member for providing structural support thereagainst, said support member having a surface area that covers substantially the open end of the container and further having at least one opening formed therein at a location adjacent to said groove formed in said seal member, wherein said opening has a wall section displaced on one side of the groove and a wall section displaced on another side of the groove.

15. The electrochemical cell as defined in claim 14, wherein said wall sections define at least one opening.

16. The electrochemical cell as defined in claim 15, wherein said support member further has a wall section adjacent said groove such that said support member further provides support directly against a portion of said groove.

17. The electrochemical cell as defined in claim 14, wherein said groove is centrally located within said opening.

18. The electrochemical cell as defined in claim 14, wherein said seal member provides a seal for a substantially circular opening, and said groove comprises a substantially circular groove.

19. The electrochemical cell as defined in claim 14, wherein said seal member comprises nylon.

20. The electrochemical cell as defined in claim 14, wherein said support member comprises metal.

21. The electrochemical cell as defined in claim 14, wherein said groove includes walls and a corner formed between two adjoining walls.

22. The electrochemical cell as defined in claim 14, wherein said groove has a ratio of width to thickness in the range of 0.2–1.2.

23. The electrochemical cell as defined in claim 14, wherein said at least one opening formed in said support member has a ratio of length to width greater than 1.0.

24. The electrochemical cell as defined in claim 14, wherein said groove is formed in a substantially planar membrane of said seal member.

25. The electrochemical cell as defined in claim 24, wherein a ratio of thickness of said membrane to width of the opening in said support member is in the range of 0.1–0.2.

26. A method of assembling an electrochemical cell comprising the steps of:
   providing a container having a closed bottom end and an open top end;
   disposing a positive electrode in said container;
   disposing a negative electrode in said container;
   disposing a separator between said positive electrode and said negative electrode;
   disposing an electrolyte in said container;
   providing a seal member having a stress concentrator including a groove formed in a surface of the seal member;

disposing said seal member in the open top end of said container for closing said open top end of said container; and disposing a support member in said open top end of said container and against a surface of said seal member for providing structural support thereagainst, said support member having a surface area that covers substantially the open end of the container and further having at least one opening formed therein at a location adjacent to said groove formed in said seal member, wherein said opening has a wall section displaced on one side of the groove and a wall section displaced on another side of the groove.

27. The method as defined in claim 26 further comprising the step of crimping a peripheral edge of said container at said open top end onto an outer cover located above said support member.

28. The method as defined in claim 26 further comprising the step of disposing a collector through an aperture formed in said seal member, said seal member forming a seal against said collector.

29. An electrochemical cell comprising:

a container having a closed bottom end and an open top end;

a positive electrode disposed in said container;

a negative electrode disposed in said container;

a separator disposed between said positive electrode and said negative electrode;

a seal member disposed in the open top end of said container for closing the open top end of said container, said seal member having a stress concentrator including a groove formed in a surface of the seal member; and a support member disposed in the open top end of said container and against a surface of said seal member for providing structural support against the seal member, said support member having a surface area that covers substantially the open end of the container and further having at least one opening formed therein, wherein at least a portion of said groove is substantially adjacent to and substantially centered within said at least one opening, and said opening has a wall section displaced on one side of the groove and a wall section displaced on another side of the groove so as to allow the seal member to flex and the groove to rupture at a determined pressure differential.

* * * * *